United States Patent Office 3,033,862
Patented May 8, 1962

3,033,862
PROCESS FOR PRODUCING 19-NOR-PROGESTERONE AND 6,19-OXIDO AND LACTONE INTERMEDIATES THEREIN
Howard J. Ringold and Albert Bowers, Mexico City, Mexico, assignors to Syntex S.A., Mexico City, Mexico, a corporation of Mexico
No Drawing. Filed July 28, 1960, Ser. No. 45,790
Claims priority, application Mexico Jan. 6, 1960
14 Claims. (Cl. 260—239.55)

The present invention relates to novel cyclopentanophenanthrene compounds and to a method for the preparation thereof.

More particularly the invention relates to novel 6β,19 oxido and lactones of the pregnane series having hydroxy, acyloxy or ether groups at C–3 and at C–20.

The novel compounds of the present invention which are progestational agents with anti-androgenic, anti-estrogenic and anti-gonadotrophic activity are represented by the following formulas:

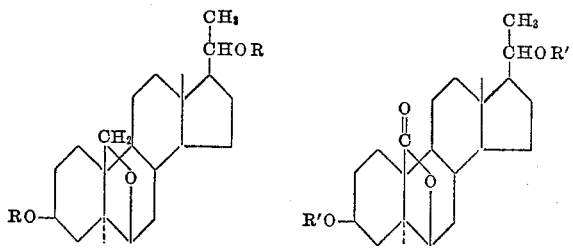

In the above formula R represents hydrogen or a hydrocarbon carboxylic acyl group of less than 12 carbon atoms and R' represents hydrogen, a hydrocarbon carboxylic acyl group of less than 12 carbon atoms or an ether group. The acyl groups are derived from hydrocarbon carboxylic acids containing up to 12 carbon atoms, saturated or unsaturated, of straight, branched, cyclic or cyclic-aliphatic chain, aromatic and may be substituted by functional groups such as hydroxyl, acyloxy of up to 12 carbon atoms, alkoxy of up to 8 carbon atoms, amino or halogen. Typical ester groups include the acetate, propionate, butyrate, hemisuccinate, enanthate, caproate, benzoate, phenoxyacetate, trimethylacetate, aminoacetate, cyclopentylpropionate and β-chloropropionate. The ether group is derived from dihydropyran.

The novel compounds of the present invention also are cardiac anti-fibrillatory agents, lower blood cholesterol levels, have bactericidal activities against both gram positive and gram negative bacteriae and are useful in the treatment of premenstrual tension. Further, the novel compounds are useful intermediates for the preparation of the valuable 19-nor-progesterone. This novel method of producing 19-nor-pregnanes from 10-methyl pregnanes is of great practical value since it avoids the conventional methods of aromatizing ring A and the subsequent Birch reduction which are difficult to carry out on an industrial scale.

The novel compounds of the present invention and the method of producing 19-nor-progesterone are illustrated by the following equation:

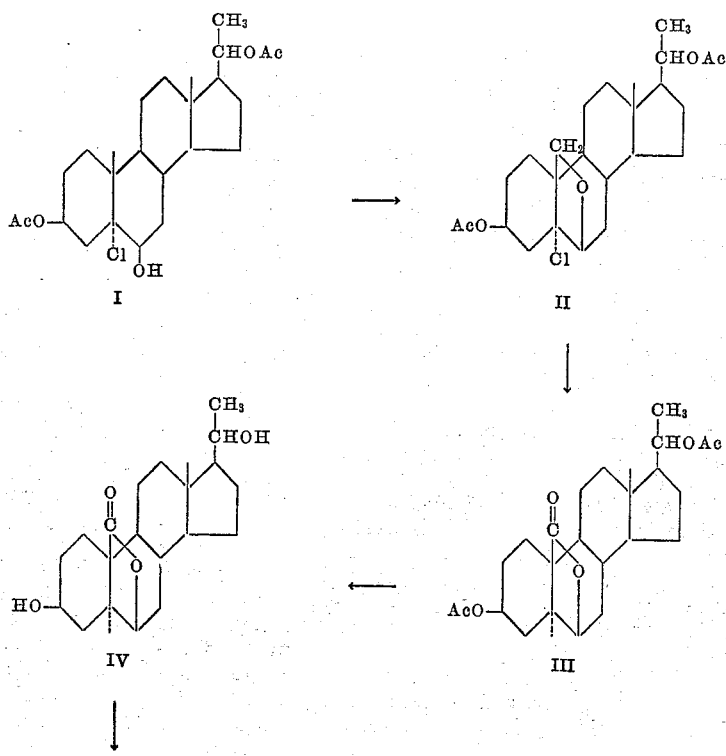

ester of 3,20-diketo-$\Delta^4$-pregnene-19-carboxylic acid (IX). The ester is then hydrolyzed by alkaline treatment and the alkali metal salt of 3,20-diketo-$\Delta^4$-pregnene-19-carboxylic acid is heated with hydrochloric acid to achieve decarboxylation at C–19 to produce 19-nor-progesterone (X).

The 19-nor-progesterone may also be prepared by starting with the diacetate of $\Delta^5$-pregnene-3$\beta$,20$\alpha$-diol, described by Turner et al., J. Am. Chem. Soc., 73, 2283 (1957), instead of the diacetate of $\Delta^5$-pregnene-3$\beta$,20$\beta$-diol, in which case the respective intermediates having the $\alpha$-configuration with respect to the acetoxy, hydroxy and pyranyloxy groups at C–20 are obtained.

The following examples serve to illustrate but are not intended to limit the present invention:

Example I

A suspension of 10 g. of the diacetate of $\Delta^5$-pregnene-3$\beta$,20$\beta$-diol in 100 cc. of dioxane was treated with 12 cc. of 0.46 N perchloric acid and then with 4 g. of N-bromoacetamide; the N-bromoacetamide was added little by little, with stirring, in the course of 1 hour, in the dark and maintaining the temperature around 15° C. The mixture was stirred for 1 hour further in the dark at room temperature and then decolorized by the addition of 10% aqueous sodium bisulfite solution; 1 lt. of water was added and the product was extracted with methylene chloride; the extract was washed with water, dried over anhydrous sodium sulfate and the solvent was evaporated under reduced pressure and at room temperature. The residue consisted of the 3,20-diacetate of 5$\alpha$-bromo-pregnane-3$\beta$,6$\beta$,20$\beta$-triol.

There was prepared 100 cc. of an 8 N solution of chromic acid from 26.7 g. of chromium trioxide, 23 cc. of concentrated sulfuric acid and distilled water. A solution of 10 g. of the 3,20-diacetate of 5$\alpha$-bromo-pregnane-3$\beta$,6$\beta$,20$\beta$-triol in 100 cc. of acetone was cooled to 0° C., flushed with nitrogen and treated with the 8 N solution of chromic acid until the characteristic color of chromium trioxide persisted in the mixture. The 8 N chromic acid solution was added in a thin stream, under an atmosphere of nitrogen and with stirring at 0° C. The mixture was then stirred at 0° C. under an atmosphere of nitrogen for 2 minutes further, poured into ice water and the precipitate formed was collected by filtration, washed with water and dried under vacuum, thus giving the diacetate of 5$\alpha$-bromo-pregnane-3$\beta$,20$\beta$-diol-6-one.

The above compound was mixed with 10 g. of zinc dust and 250 cc. of glacial acetic acid and heated at 90° for 1 hour, at the end of which it was filtered through celite under an atmosphere of nitrogen, the filtrate was concentrated to a small volume under reduced pressure, cooled and diluted with ice water to precipitate the diacetate of 5$\alpha$-pregnane-3$\beta$,20$\beta$-diol-6-one, which was collected, washed with water and dried.

The above crude diacetate of 5$\alpha$-pregnane-3$\beta$,20$\beta$-diol-6-one was dissolved in a mixture of 80 cc. of absolute ethanol and 120 cc. of glacial acetic acid and hydrogenated in a "Parr" instrument at 50 atmospheres in the presence of 1.2 g. of platinum oxide, with vigorous stirring and at room temperature for 24 hours, at the end of which the catalyst was removed by filtration and the filtrate was evaporated to dryness under reduced pressure; the residue was purified by chromatography on neutral alumina. There was thus obtained the 3,20-diacetate of 5$\alpha$-pregnane-3$\beta$,6$\beta$,20$\beta$-triol.

Example II

To a solution of 4 g. of the 3,20-diacetate of 5$\alpha$-pregnane-3$\beta$,6$\beta$,20$\beta$-triol in 150 cc. of dry benzene was added 6 g. of lead tetraacetate and the mixture was refluxed for 18 hours. It was then cooled, filtered, diluted with water and the benzene layer was separated, washed with water and the benzene was evaporated under reduced pressure; by chromatography of the residue on neutral alumina there was obtained the diacetate of 6$\beta$,19-oxido-5$\alpha$-pregnane-3$\beta$,20$\beta$-diol.

1.0 g. of the latter compound dissolved in 50 cc. of 2% methanolic potassium hydroxide solution was allowed to stand overnight at room temperature. After acidifying with dilute hydrochloric acid and heating for one half hour on the steam bath, the mixture was cooled, diluted with ice water and extracted with several portions of ether. The combined extract was washed with water, dried over anhydrous sodium sulfate and the ether was evaporated to thus furnish 6$\beta$,19-oxido-5$\alpha$-pregnane-3$\beta$,20$\beta$-diol.

Example III

To a solution of 2.5 g. of the diacetate of 6$\beta$,19-oxido-5$\alpha$-pregnane-3$\beta$,20$\beta$-diol in 50 cc. of acetic acid was added 2.5 g. of chromium trioxide dissolved in 100 cc. of 90% acetic acid. The mixture was then kept at 90° for 1 hour and the product was precipitated by the addition of ice water and collected. Recrystallization from acetone-hexane yielded the 6,19-lactone of 3$\beta$,20$\beta$-diacetoxy-5$\alpha$-pregnane-6$\beta$-ol-19-carboxylic acid.

Example IV

A solution of 2 g. of the above compound in 100 cc. of 2% methanolic potassium hydroxide solution was kept overnight at room temperature. It was then acidified with 2 N hydrochloric acid, heated for half an hour on the steam bath, cooled, diluted with ice water and the product was extracted with several portions of ether. The combined extract was washed with water, dried over anhydrous sodium sulfate and the ether was evaporated. There was thus obtained the 6,19-lactone of 5$\alpha$-pregnane-3$\beta$,20$\beta$,6$\beta$-triol-19-carboxylic acid.

Example V

The above compound was dissolved in 100 cc. of benzene, treated with 10 cc. of dihydropyrane and then with 300 mg. of p-toluenesulfonic acid monohydrate and kept at room temperature for 24 hours. It was then successively washed with 5% aqueous sodium bicarbonate solution and water, dried over anhydrous sodium sulfate and the benzene was evaporated under reduced pressure, to produce the 6,19-lactone-3$\beta$,20$\beta$-bis tetrahydropyranyloxy-5$\alpha$-pregnan-6$\beta$-ol-19-carboxylic acid.

Example VI

A solution of 2 g. of the above compound in 200 cc. of acetone was treated with a solution of 2 g. of potassium hydroxide in 20 cc. of water and the mixture was refluxed for 1 hour, cooled and then treated with 10 cc. of dimethyl sulfate. The mixture was kept at 20° C. for 18 hours, at the end of which it was slowly treated with ice water under stirring until complete precipitation of the product, which was collected, washed with water and air dried. There was thus obtained the methyl ester of 3$\beta$,20$\beta$-bis-tetrahydropyranyloxy-5$\alpha$-pregnan-6$\beta$ - ol - 19-carboxylic acid.

Example VII

The above compound was dissolved in 50 cc. of pyridine, cooled to 0° C. and treated little by little with 2 cc. of thionyl chloride, with stirring and maintaining the temperature around 0° C. After 3 hours more at 0° C. the mixture was poured into ice water and the product was extracted with ether. The extract was washed with water, the ether was evaporated and the residue purified by chromatography on neutral alumina, thus furnishing the methyl ester of 3$\beta$,20$\beta$-bis-tetrahydropyranyloxy-$\Delta^5$-pregnene-19-carboxylic acid.

Example VIII

To a solution of 1 g. of the above compound in 20 cc. of acetic acid was added 2 cc. of 2 N hydrochloric acid and the mixture was kept at room temperature for 30 minutes, at the end of which the product was precipitated by the addition of water, collected, washed with water and dried. There was thus obtained the methyl ester of $\Delta^5$-pregnene-3β,20β-diol-19-carboxylic acid.

*Example IX*

From a solution of 1 g. of the above compound in 50 cc. of dry toluene and 10 cc. of cyclohexanone there were removed the traces of moisture by azeotropic distillation of 10 cc. and then there was added 500 mg. of aluminum isopropylate dissolved in 5 cc. of anhydrous toluene; the mixture was then refluxed for 45 minutes, at the end of which the volatile solvents were removed by steam distillation. The residue was extracted with ethyl-acetate and the extract was washed with water, hydrochloric acid solution and then with water to neutral, dried over anhydrous sodium sulfate and evaporated to dryness. The residue consisted essentially of the methyl ester of 3,20-diketo-$\Delta^4$-pregnene-19-carboxylic acid; the latter was dissolved in 50 cc. of 2% methanolic potassium hydroxide solution and kept overnight at room temperature. It was then acidified with dilute hydrochloric acid and heated on the steam bath for 30 minutes. The mixture was concentrated to a small volume, cooled, diluted with water and the precipitate was collected, washed with water, dried and purified by chromatography on neutral alumina, thus yielding 19-nor-progesterone.

We claim:
1. A compound of the following formula:

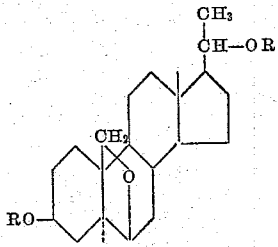

wherein R is selected from the group consisting of hydrogen and a hydrocarbon carboxylic acyl group of less than 12 carbon atoms.

2. The diacetate of 6β,19-oxido-5α-pregnane-3β,20β-diol.
3. 6β,19-oxido-5α-pregnane-3β,20β-diol.
4. A compound of the following formula:

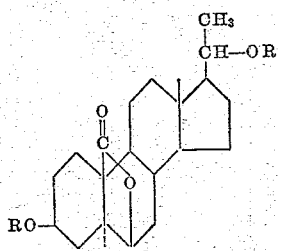

wherein R is selected from the group consisting of hydrogen, a hydrocarbon carboxylic acyl group of less than 12 carbon atoms and a cyclic ether group containing less than 5 carbon atoms.

5. The 6,19-lactone of 5α-pregnane-3β,6β,20β-triol-19-carboxylic acid.
6. The 6,19-lactone of 3β,20β-diacetoxy-5α-pregnane-6β-ol-19-carboxylic acid.
7. The 6,19-lactone of 3β,20β-bis-tetrahydropyranyloxy-5α-pregnane-6β-ol-19-carboxylic acid.
8. In the process of producing 19-nor-progesterone the steps comprising condensing a 6β-hydroxy-5α-pregnane with lead tetraacetate to form a 6β,19-oxido-5α-pregnane and then oxidizing with chromium trioxide to form the corresponding 6,19-lactone of 5α-pregnane-6β-ol-19-carboxylic acid.
9. The process of claim 8 wherein the 6β-hydroxy 5α-pregnane is 3β,20β-diacetoxy-6β-hydroxy-5α-pregnane.
10. The process of claim 8 wherein the condensation is effected in an inert organic solvent.
11. The process of claim 8 wherein the condensation is effected in benzene.
12. In the process of producing 19-nor-progesterone the step which comprises reacting a 3β,20β-diacyloxy-6β-hydroxy-5α-pregnane with lead tetraacetate.
13. A process for producing 19-nor-progesterone which comprising condensing 3β,20-diacyloxy-5α-pregnane-6β-ol with lead tetraacetate, oxidizing the thus formed 6β,19-oxido-3β,20-diacyloxy-5α-pregnane with chromic trioxide to form the 6,19-lactone of 3β,20-diacyloxy-5α-pregnane-6β-ol-19-carboxylic acid, treating the latter with a saponifying agent and then with a mineral acid, reacting the thus formed 6,19-lactone of 5α-pregnane-3β,6β,20-triol-19-carboxylic acid with dihydropyran to form the 3,20-bis-tetrahydropyranyl ether of the 6,19-lactone of 5α-pregnane-3β,6β,20-triol-19-carboxylic acid, treating the latter compound with an alkali metal hydroxide and a di-lower alkyl sulfate to form the lower alkyl esters of 3β,20-bis-tetrahydropyranyloxy-pregnane-6β-ol-19-carboxylic acid, dehydrating the latter compound with an acid to produce the lower alkyl ester of 3β,20-bis-tetrahydropyranyloxy-$\Delta^5$-androstene-19-carboxylic acid, hydrolyzing the ether groups with a mineral acid followed by treatment with an aluminum alkoxide in the presence of a ketone hydrogen acceptor to form the lower alkyl ester of 3,20-diketo-$\Delta^4$-pregnane-19-carboxylic acid, hydrolyzing the latter compound with an alkali metal hydroxide and decarboxylating by heating with a mineral acid to form 19-nor-progesterone.
14. The process of claim 13 wherein the 3β,20-diacyloxy-6β-hydroxy-5α-pregnane is 3β,20β-diacetoxy-6β-hydroxy-5α-pregnane.

No references cited.

UNITED STATES PATENT OFFICE
CERTIFICATE OF CORRECTION

Patent No. 3,033,862  May 8, 1962

Howard J. Ringold et al.

It is hereby certified that error appears in the above numbered patent requiring correction and that the said Letters Patent should read as corrected below.

Column 2, formulas 1 and 2 should appear as shown below instead of as in the patent:

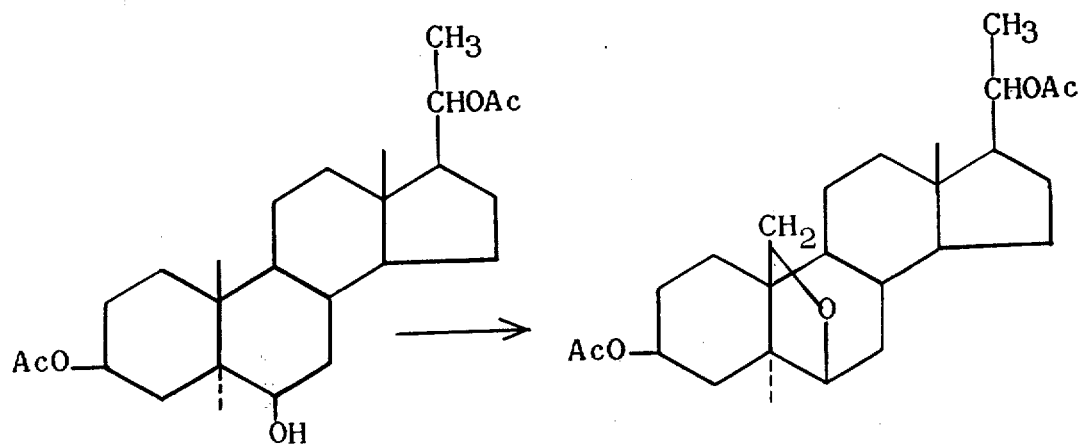

Signed and sealed this 4th day of September 1962.

(SEAL)
Attest:
ERNEST W. SWIDER
Attesting Officer

DAVID L. LADD
Commissioner of Patents